(12) United States Patent  (10) Patent No.: US 8,554,395 B2
Andersson  (45) Date of Patent: Oct. 8, 2013

(54) METHOD AND SYSTEM FOR FACILITATING AUTONOMOUS LANDING OF AERIAL VEHICLES ON A SURFACE

(75) Inventor: Daniel Andersson, Linköping (SE)

(73) Assignee: SAAB AB, Linköping (SE)

( * ) Notice: Subject to any disclaimer, the term of this patent is extended or adjusted under 35 U.S.C. 154(b) by 225 days.

(21) Appl. No.: 13/139,864

(22) PCT Filed: Dec. 15, 2008

(86) PCT No.: PCT/SE2008/051463
§ 371 (c)(1),
(2), (4) Date: Jun. 15, 2011

(87) PCT Pub. No.: WO2010/071505
PCT Pub. Date: Jun. 24, 2010

(65) Prior Publication Data
US 2012/0130566 A1   May 24, 2012

(51) Int. Cl.
 *G06F 19/00*  (2011.01)
(52) U.S. Cl.
 USPC .... 701/16; 701/3; 701/14; 701/36; 244/158.1
(58) Field of Classification Search
 USPC ................... 701/3, 14, 16, 23, 36; 244/158.1
 See application file for complete search history.

(56) References Cited

U.S. PATENT DOCUMENTS

| | | |
|---|---|---|
| 2,064,722 A | 12/1936 | Bartow |
| 2,316,751 A | 4/1943 | Adler, Jr. |
| 3,721,499 A | 3/1973 | Narbaits-Jaureguy |
| 4,868,567 A | 9/1989 | Eichweber |
| 4,914,460 A | 4/1990 | Caimi et al. |
| 4,995,722 A | 2/1991 | Sutour |
| 5,315,296 A | 5/1994 | Kaiser et al. |
| 2004/0252293 A1 | 12/2004 | Laver et al. |

FOREIGN PATENT DOCUMENTS

| | | |
|---|---|---|
| EP | 1555545 A1 | 7/2005 |
| EP | 1857362 A1 | 11/2007 |
| GB | 444326 A | 3/1936 |
| WO | WO-2008061307 A1 | 5/2008 |

OTHER PUBLICATIONS

Z. Zhang et al.; "Evolving Neural Networks for Video Attitude and Height Sensor"; Proceedings of the SPIE—The International Society for Optical Engineering; 1995; vol. 2484; pp. 383-393; figures 1-3.
PCT/ISA/210—International Search Report—Jul. 24, 2009.
PCT/IPEA/409—International Preliminary Report on Patentability—Feb. 28, 2011.
PCT/ISA/237—Written Opinion of the International Searching Authority—Jul. 24, 2009.
Supplementary European Search Report—Mar. 28, 2013—Issued in Connection With Counterpart European Patent Application No. 08878978.9.

*Primary Examiner* — Gertrude Arthur Jeanglaude
(74) *Attorney, Agent, or Firm* — Venable LLP; Eric J. Franklin

(57) ABSTRACT

A system for facilitating autonomous landing of aerial vehicles on a surface. A beam emitter is directed downwards. A control module is configured to govern the vehicle. A processor processes image data. The beam emitter is arranged to emit simultaneously at least four beams directed towards the surface in order to project a pattern thereon. One beam emitter of the at least four beam emitters is placed in the center. An image capturing module captures subsequent images of the pattern.

14 Claims, 2 Drawing Sheets

METHOD AND SYSTEM FOR FACILITATING AUTONOMOUS LANDING OF AERIAL VEHICLES ON A SURFACE

CROSS-REFERENCE TO RELATED APPLICATIONS

This application is the national phase under 35 U.S.C. §371 of PCT/SE2008/051463 filed 15 Dec. 2008.

TECHNICAL FIELD

The present invention relates to a system and a method for autonomous landing of aerial vehicles on a surface.

BACKGROUND OF THE INVENTION

When landing an aerial vehicle, such as an unmanned helicopter, it is important that the aerial vehicle has access to accurate information regarding movement, position and attitude relative to the surface of the landing area. In particular, when landing on the platform of a ship, the sea continuously effects the attitude of the ship and hence the landing platform. The movement of the platform has three degrees of freedom. The inclination is determined by the pitch and the roll, and there is also a movement in the vertical direction, for example if there is a heavy sea, the amplitude of the waves can change the distance between the ship and the vehicle by quite a large amount. It is therefore important to be able to determine when the helicopter is sufficiently parallel to the platform.

U.S. Pat. No. 4,868,567 discloses a landing approach aid for a helicopter provided with a spotlight, a television camera and displaying device, and where the landing field exhibits mirrors. The landing can then be carried out on the basis of the light beams reflected by the mirrors which specify the location of the mirrors on the television image.

U.S. Pat. No. 4,995,722 discloses a helicopter that incorporates means for emitting a conical light beam, and a landing platform on a ship that incorporates photosensitive cells that detect the conical light beam and calculates the attitude of the helicopter. From this landing data are displayed on a panel which the pilot can see in order to land.

U.S. Pat. No. 3,721,499 discloses a night navigation and landing device, wherein a television camera is carried by a helicopter. A video monitor is also provided with scales on which the camera shows the images of two light beams projected from the aircraft. The light beams are linear and parallel and orientated in the observation axis of the camera. When the pilot has reached the zone where he has to land, he locates his landing ground by means of the camera, governs the helicopter by the aid of reflected beams from spotlights on the helicopter and takes then into account his position and the line of descent suitable for the landing, which he has to carry out.

EP 1 555 545 A1 discloses a multi-beam rangefinder system comprising a transmitter arrangement in which pulses are produced sequentially in three fixed non-coplanar directions, and the points which the pulses arrive at the ground define a plane. A planar model passing through these points then approximates the ground whereby it is possible to estimate range derived values including an altitude of the airborne platform relative to the ground, a time to land on the ground, roll and pitch as well as the angular velocity and angular acceleration.

A problem with the systems according to U.S. Pat. No. 4,995,722 and U.S. Pat. No. 4,868,567 are that they are dependent on devices placed on the landing platform, such as photosensitive cells or mirrors. In U.S. Pat. No. 3,721,499 a pilot governs the helicopter by the aid of reflected beams from the spotlights on the helicopter, and in EP 1 555 545 A1 a planar estimation model of the ground is needed to calculate for example a time to land on the ground.

There is thus a need of a landing system which can manage to facilitate autonomous landing independent of devices placed on the landing platform or even a pilot, or as a supplement for or a complement to a complex plane calculation in order to predict a time to land on the ground. There is also a need of determining when the landing has actually been performed.

OBJECTIVE OF THE INVENTION

It is therefore an objective of the present invention to provide a system and a method for facilitating autonomous landing of an aerial vehicle, such as an unmanned helicopter, independent of devices, such as photosensitive cells or mirrors, placed on a landing platform, and which can be used for a complex plane calculation in order to predict a time to land on the surface. Furthermore the system and the method determine automatically when the landing has actually been performed.

SUMMARY OF THE INVENTION

This objective is achieved according to the present invention by a system for facilitating autonomous landing of aerial vehicles on a surface, comprising beam emitting means directed downwards and control means to govern the vehicle, wherein the system is characterized in that it comprises image capturing means and processing means to process image data, wherein the beam emitting means are arranged to emit simultaneously at least four beams directed towards the surface in order to project a pattern thereon, wherein one beam emitting means of the at least four beam emitting means is placed in the centre; and that the image capturing means captures subsequent images of the pattern.

By this is achieved a way of using image pattern analysis of a projected pattern instead of relying on information from time measurements of reflected laser beams. The use of image pattern analyzing means has an advantage over detecting the time difference between emitted and reflected laser beams since laser beams could be deflected. An image pattern may also be unaffected by obscurities and also clearly visible through e.g. fog or cloud in for example the infrared spectrum.

The system is further characterized in that the beam emitting means are arranged such that at least three beam emitting means are symmetrically arranged at equal distances from the one beam emitting means placed in the centre, and in one preferred embodiment in that the beam emitting means are arranged such that at least four beam emitting means are arranged in pairs along a longitudinal and a transverse line of the vehicle with the one beam emitting means placed in the centre, and wherein the beam emitting means are arranged such that at least three beams are directed inwards towards the beam emitted from the one beam emitting means placed in the centre such that the at least three beams intersect in the same point.

The system is also characterized in that the processing means to process image data are arranged to analyze the pattern in the subsequent images, and in that the processing means are arranged to during a time interval analyze the movements of the pattern in the subsequent images in order to predict a favorable occasion to land, wherein the analyzed pattern discloses attitude, altitude and movement of the aerial vehicle relative to the surface, and wherein the analyzed pattern determines when the aerial vehicle has landed on the surface.

By this is achieved a way of determining how the aerial vehicle, such as a UAV, moves in relation to the surface in real time, but also a way to predict how the platform will move in a near future and thereby estimate a favorable time occasion to land, as well as a way of determining when the aerial vehicle has landed, which occurs when all the other projected spots merge with the spot projected on the surface by the beam emitted from the one emitting means in the centre.

This objective is also achieved according to the present invention by a method for facilitating autonomous landing of aerial vehicles on a surface, comprising beam emitting means directed downwards and control means to govern the vehicle, wherein the system is characterized by the steps of emitting simultaneously at least four beams directed towards the surface in order to project a pattern thereon, wherein one beam of the at least four beams is emitted from one beam emitting means placed in the centre, capturing subsequent images of the pattern, processing image data of the captured images, storing the processed image data, and governing the vehicle by the use of the processed image data in order to keep the vehicle parallel to the surface and land thereon.

The method is further characterized in that at least three emitted beams are directed inwards towards the beam emitted from the one beam emitting means placed in the centre such that the at least three beams intersect in the same point, wherein processing image data of the captured images comprises analyzing the pattern in the subsequent images, and processing image data during a time interval comprises analyzing the movements of the pattern in the subsequent images in order to predict a favorable occasion to land, wherein the analyzed pattern discloses attitude, altitude and movement of the aerial vehicle relative to the surface, and wherein the analyzed pattern determines when the aerial vehicle has landed on the surface. This occurs when all the other projected spots merge with the spot projected by the beam emitted from the one emitting means in the centre.

DETAILED DESCRIPTION

Figure 1:
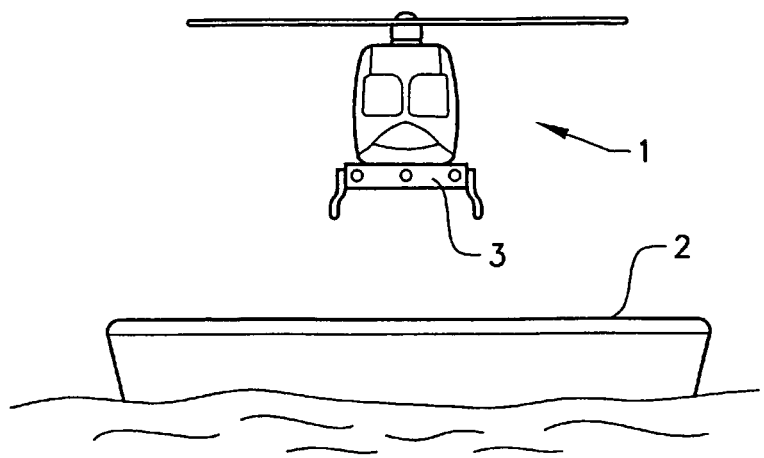
FIG. 1. shows schematically an aerial vehicle hovering above a landing platform.
Figure 2:
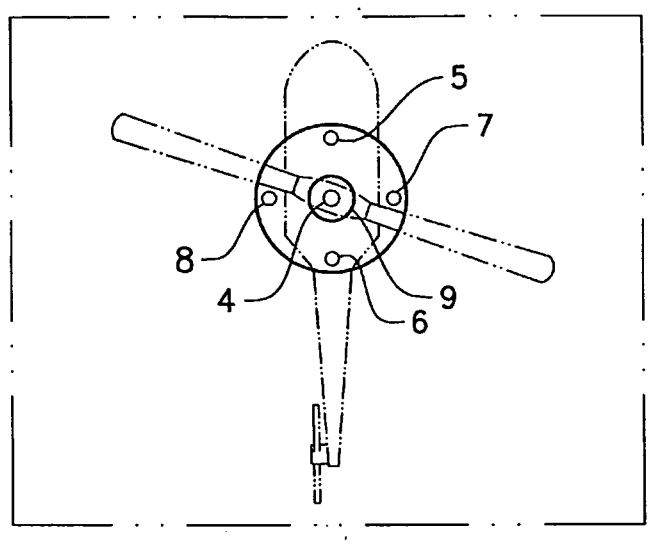
FIG. 2. shows schematically, from above, the aerial vehicle hovering above the landing platform.
Figure 3:
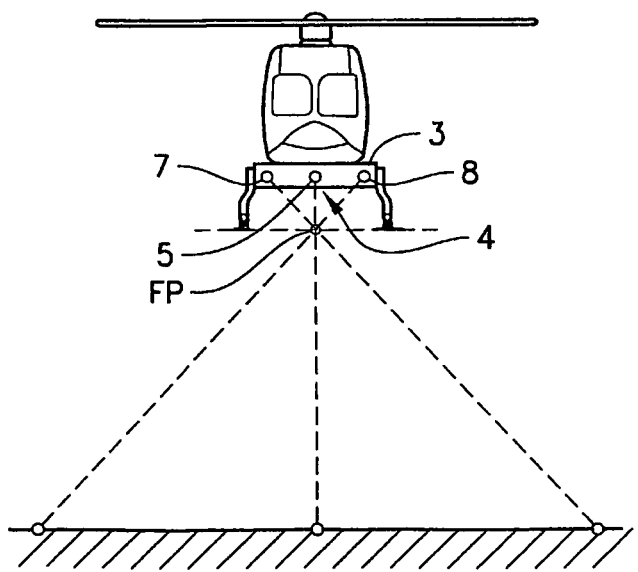
FIG. 3. shows schematically a front view of the aerial vehicle emitting beams and hovering above the landing platform.
Figure 4:
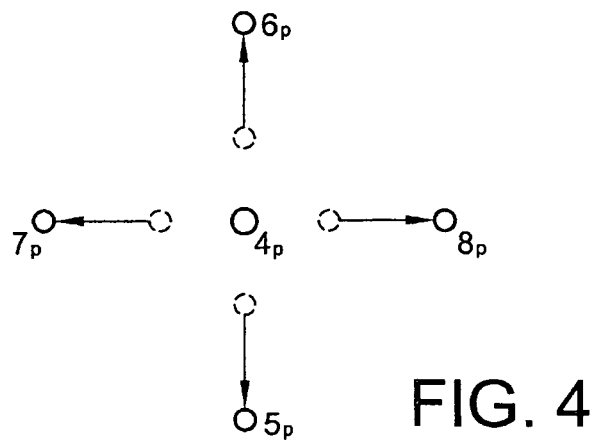
FIG. 4. illustrates schematically how the projected pattern will change during ascending of the aerial vehicle in a parallel position to the landing platform.

FIG. 1 shows an aerial vehicle 1, preferably an unmanned aerial vehicle (UAV), in the present case a helicopter, which has moved into a position above a surface 2 of a landing platform on a ship at sea. The UAV is equipped with a system 3 for autonomous landing. According to an embodiment of the invention FIG. 2 shows a helicopter seen from above and illustrates how the system 3, comprising five light sources 4,5,6,7,8 and a digital camera 9 is arranged beneath the helicopter. The five light sources 4,5,6,7,8 are arranged in a cross, where one light source 4 is positioned in the centre together with the digital camera 9, and from that light source the other four light sources 5,6,7,8 are positioned at equal distances in the same plane. Two of them 5, 6 are aligned with a longitudinal line which joins the front and back of the helicopter, and the other two light sources 7, 8 are aligned with a line perpendicular to that line in the same plane, i.e. a transverse line joining the right side and the left side of the helicopter. The light source in the centre emits a beam directed in a vertical direction downwards. The other light sources are directed towards that beam at fixed angles in such a way that all beams coincide in a single spot when the UAV is standing on the surface of a landing platform. This point could also be seen as a focal point FP in that plane as can be seen in FIG. 3. When the helicopter is moving upwards in an attitude parallel to the platform, the projected spots will all start to move symmetrically on the platform in an outward radial direction on the surface, as can be seen in FIG. 4, which in turn constitutes a projected pattern of the spots on the surface, or seen in an alternative way, the projected light spot 5p emitted from the light source 5 positioned at the front starts to move backwards and the projected light spot 6p emitted from the light source 6 at the back starts to move forwards. The projected light spot 7p emitted from the light source 7 at the right hand side of the helicopter will move in a direction normal to the left hand side of the helicopter, i.e. to the left on the landing surface, and the projected light spot 8p emitted from the light source 8 at the left hand side will move in a direction normal to the right hand side of the helicopter; i.e. to the right on the landing surface. If the helicopter starts to move downwards, i.e. when the helicopter descends in order to land on the surface, all the above described movements of the spots on the surface will be in the opposite direction and hence start to move inwards against the projected center spot emitted from the light source in the centre beneath the helicopter. When the helicopter has landed all the other spots will merge with the spot projected by the beam in the centre into one single spot.

It is also conceivable that only four light sources are used. Where one light source is placed in the centre and the other three light sources are placed at preferably equal distances from the light source in the centre in the formation of a triangle.

Figure 5:
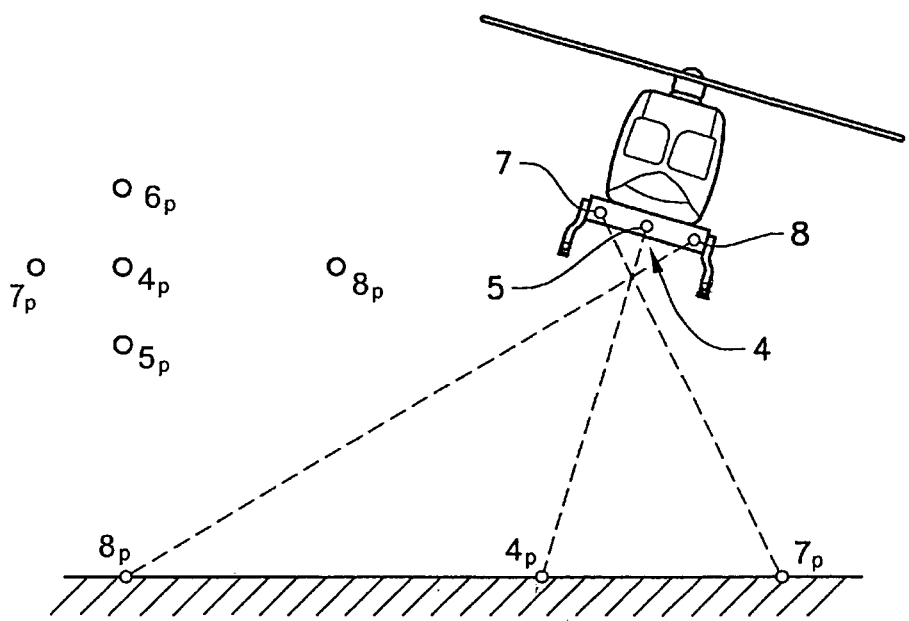
FIG. 5. illustrates schematically how the projected pattern will change when the aerial vehicle is banking to the left at a constant altitude.

As long as the helicopter is hovering in an attitude parallel to the surface the spots will be positioned at equal distances from the center spot and constitute thereby a symmetrical pattern. If the helicopter instead, for example, is hovering at a constant altitude but tilted in some direction which is not parallel to the surface of the landing platform, or the horizontal, e.g. the helicopter is banking to the left or right during landing, the pattern will not be symmetrical. As can be seen in FIG. 5, in the case that the helicopter is banking to the left, the left hand spot 8p will be positioned at a farther distance than the other three spots 5p,6p,7p from the center spot 4p projected on the surface, and the distance will be a function of the amount of inclination, or banking. Other, and more complicated, types of inclinations of the helicopter, or the surface, than the type described above will be possible to disclose from this pattern as well.

All these projected patterns on the surface of the landing platform are either photographed or recorded by the digital/video camera 9 in real time. The pattern, which gives information about the attitude of the UAV as well as the altitude and the movements, captured in the images are then consecutive analyzed and the image data processed by the processor 10. The mutual distances between the four projected spots to each other and the center spot in the captured image pattern will give information about the attitude and movement of the helicopter, or the surface. If, for example, the amount of inclination exceeds certain threshold values, an autonomous control system adjusts the attitude of the helicopter in order to straighten it up in a parallel position in relation to the surface of the landing platform. If the landing platform is moving during descending of the helicopter, the helicopter will compensate for that movement in order to keep itself parallel to the surface of the landing platform during landing thereon.

By analyzing how the movements in the pattern change during a time interval, it is also possible to predict how the platform will move in a near future and estimate by equations in what way the platform is moving, and from these equations determine the altitude, the vertical movement, the pitch and roll angle, as well as the angular velocity and angular acceleration of the pitch and roll angles, respectively, of the platform/surface. The length of the time interval, before a command to land the helicopter is given, could be determined by either the time it takes to find a periodic move-pattern of the platform, or when some conditions of a predetermined wave equation model have been fulfilled. This model could be a more generally applicable wave equation model, or a specific wave equation model for each type of sea vessel. The helicopter will land at the moment the landing platform is predicted to become parallel or horizontal, i.e. pitch and roll are close to zero. In order to consecutively estimate the movements sufficiently accurate a Kalman filter, a least square fit and/or a rejection function may be used in combination.

The light spots preferably emit light or laser beams in the visual spectrum but they could also emit other types of beams of the electromagnetic spectrum, as for example in the infrared spectrum. The camera 9 may comprise sensors which could capture the preferred types of beams, or be able to switch between different spectra. Since the image capturing device is used to capture the pattern of the projected spots on the platform, this offers in the pattern analysis several advantages from e.g. detecting reflected laser beams and to calculate the distance by measuring the time that has elapsed between emission and reflection. Since a laser beam could be deflected if fog or a cloud obscures the landing platform, an image pattern analysis may be unaffected by such obscurities.

Figure 6:
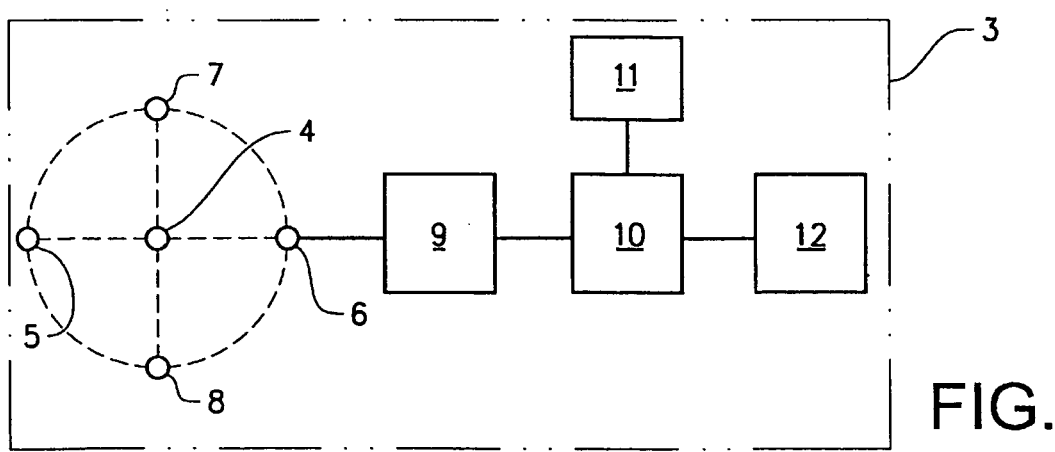
FIG. 6. shows a diagram of the system for landing according to the embodiments in FIG. 2, FIG. 3, FIG. 4, and FIG. 5 of the invention.

In FIG. 6 a diagram of the autonomous landing system 3 according to a preferred embodiment is shown in more detail. It comprises emitting means 4,5,6,7,8 which simultaneously emit beams to project the pattern on the surface, and image capturing means 9 for capturing images of the reflected pattern, the capturing means could for example be a video, or a digital camera. The reflected light spots 4p,5p,6p,7p,8p of the pattern, which are detected by the camera, are then transformed into image data and communicated to and processed in a processing device 10 in order to analyze the image data. The system may also comprise a memory storage device 11 for storing the processed and/or unprocessed measurements. The memory storage device may also comprise map information and/or geographical data bases.

Information regarding the movement, position and attitude of the UAV from e.g. sensors such as GPS, inertial sensors, accelerometers and gyroscopes comprised in 12 is used together with the image data to govern the vehicle in accordance to the surface in order to be able to land parallel thereon. This is performed by processing all information from the sensors in 12 and the image data in the processing device 10.

The described embodiments can be modified without leaving the scope of the invention, and instead of use in a UAV-application, the system and the method could also give advice and information to a pilot of how to govern an aerial vehicle for facilitate landing. If the other light sources are not placed at equal distances from the light source in the centre (i.e. resulting in a symmetrical pattern with regard of the light source in the centre) the calculations may be more complicated, and if the pattern is displayed for a human (i.e. the pilot) a non-symmetrical pattern may be a major disadvantage.

The invention claimed is:

1. An electro-optical landing system for facilitating autonomous landing of aerial vehicles on a surface, the system comprising:
at least four beam emitters directed downwards, wherein the beam emitters are arranged to emit simultaneously at least four beams directed towards the surface in order to project a pattern thereon, wherein one beam emitter of the at least four beam emitters is placed in a center of the at least four beam emitters with other of the at least four beam emitters arranged about the center;
a control module configured to govern the vehicle;
an image capturing module configured to capture subsequent images of the pattern; and
a processor configured to process image data.

2. The system according to claim 1, wherein the beam emitter is arranged such that at least three of the beam emitters are symmetrically arranged at equal distances from a fourth beam emitter placed in the center.

3. The system according to claim 1, wherein the beam emitters are arranged such that at least four of the beam emitters are arranged in pairs along a longitudinal and a transverse line of the vehicle with one beam emitter placed in the center.

4. The system according to claim 1, wherein the beam emitters are arranged such that at least three beams are directed inwards towards a beam emitted from a fourth beam emitter placed in the center such that the at least three beams intersect in a same point.

5. The system according to claim 1, wherein the processor to process image data are arranged to analyze the pattern in the subsequent images.

6. The system according to claim 1, wherein the processor arranged to during a time interval analyze movements of the pattern in the subsequent images in order to predict a favorable occasion to land.

7. The system according to claim 1, wherein the analyzed pattern discloses attitude, altitude and movement of the aerial vehicle relative to the surface.

8. The system according to claim 5, wherein the analyzed pattern determines when the aerial vehicle has landed on the surface.

9. A landing facilitation method for facilitating autonomous landing of aerial vehicles on a surface comprising beam emitters directed downwards and a control module configured to govern the vehicle, the method comprising:
emitting simultaneously at least four beams directed towards the surface in order to project a pattern thereon, wherein one beam of the at least four beams is emitted from one beam emitting emitter placed in a center of the beam emitters with other of the at least four beam emitters arranged about the center;
capturing subsequent images of the pattern;
processing image data of the captured images;
storing the processed image data; and governing the vehicle by the use of the processed image data in order to keep the vehicle parallel to the surface and land thereon.

10. The method according to claim 9, wherein at least three emitted beams are directed inwards towards the beam emitted from the one beam emitter placed in the centre such that the at least three beams intersect in a same point.

11. The method according to claim 9, wherein processing image data of the captured images comprises analyzing the pattern in the subsequent images.

12. The method according to claim 9, wherein processing image data during a time interval comprises analyzing the movements of the pattern in the subsequent images in order to predict a favorable occasion to land.

13. The method according to claim 11, wherein the analyzed pattern discloses attitude, altitude and movement of the aerial vehicle relative to the surface.

14. The method according to claim 11, wherein the analyzed pattern determines when the aerial vehicle has landed on the surface.

* * * * *